United States Patent
Wang et al.

(10) Patent No.: US 10,429,873 B2
(45) Date of Patent: Oct. 1, 2019

(54) POWER SUPPLY CIRCUIT, POWER SUPPLY CIRCUIT GENERATION METHOD, AND POWER SUPPLY CIRCUIT CONTROL METHOD

(71) Applicants: Semiconductor Manufacturing International (Shanghai) Corporation, Shanghai (CN); Semiconductor Manufacturing International (Beijing) Corporation, Beijing (CN)

(72) Inventors: Teng Ye Wang, Shanghai (CN); Chia Chi Yang, Shanghai (CN); Zhi Bing Deng, Shanghai (CN); Xian Lei Zhang, Shanghai (CN)

(73) Assignees: SEMICONDUCTOR MANF. INTL. (SHANGHAI) Corp., Shanghai (CN); SEMICONDUCTOR MANF. INTL. (BEIJING) Corp., Beijing (CN)

( * ) Notice: Subject to any disclaimer, the term of this patent is extended or adjusted under 35 U.S.C. 154(b) by 0 days.

(21) Appl. No.: 15/980,107

(22) Filed: May 15, 2018

(65) Prior Publication Data
US 2019/0004556 A1    Jan. 3, 2019

(30) Foreign Application Priority Data
Jun. 29, 2017 (CN) ............ 2017 1 0513010

(51) Int. Cl.
*G05F 3/16* (2006.01)
*H02M 1/00* (2006.01)

(52) U.S. Cl.
CPC ....... *G05F 3/16* (2013.01); *H02M 2001/0045* (2013.01)

(58) Field of Classification Search
CPC .......... G05F 1/577; G05F 3/222; G05F 3/227; G05F 3/24; G05F 3/242; G05F 3/247; H02M 3/1584
(Continued)

(56) References Cited

U.S. PATENT DOCUMENTS 5,929,692 A * 7/1999 Carsten ............... H02M 1/15
                                                  323/271
9,419,588 B1 * 8/2016 Hsu .................. H04L 25/0278
(Continued)

*Primary Examiner* — Alex Torres-Rivera
(74) *Attorney, Agent, or Firm* — Brinks Gilson & Lione

(57) ABSTRACT

The present disclosure relates to the field of intelligent wearable technologies, and provides a power supply circuit, a power supply circuit generation method, and a power supply circuit control method. The present disclosure provides a power supply circuit, including: a bandgap voltage reference Bandgap, a real-time detection and control module, and an alternate voltage source module, where the real-time detection and control module adjusts an output point voltage of the alternate voltage source module according to an output voltage of the Bandgap; and when the output point voltage of the alternate voltage source module reaches a target voltage, the real-time detection and control module closes the Bandgap and supplies power by using the alternate voltage source module. In such a power supply circuit, after adjustment of an output point voltage of an alternate voltage source module is completed, a Bandgap does not need to keep a power-supply state, and therefore power consumed by the Bandgap is reduced based on stable voltage supply.

22 Claims, 11 Drawing Sheets

(58) Field of Classification Search
USPC ........................................................ 323/272
See application file for complete search history.

(56) References Cited

U.S. PATENT DOCUMENTS

| | | | |
|---|---|---|---|
| 2010/0109622 A1* | 5/2010 | Miki | H02M 3/1584 |
| | | | 323/272 |
| 2013/0234692 A1* | 9/2013 | Liang | G05F 3/242 |
| | | | 323/304 |
| 2015/0054486 A1* | 2/2015 | Li | G05F 3/16 |
| | | | 323/314 |
| 2017/0160763 A1* | 6/2017 | Barbelenet | G05F 1/468 |

* cited by examiner

POWER SUPPLY CIRCUIT, POWER SUPPLY CIRCUIT GENERATION METHOD, AND POWER SUPPLY CIRCUIT CONTROL METHOD

RELATED APPLICATIONS

The present application claims priority to Chinese Patent Appln. No. 201710513010.9, filed Jun. 29, 2017, the entire disclosure of which is hereby incorporated by reference.

BACKGROUND

Technical Field

The present application relates to the field of intelligent wearable technologies, and in particular, to a power supply circuit, a power supply circuit generation method, and a power supply circuit control method.

Related Art

With the development of wearable electronic technologies, reducing power consumption to extend usage duration is increasingly important. A bandgap voltage reference Bandgap may provide a stable voltage that, when its power consumption is reduced, is more applicable to a wearable electronic device.

Bandgap circuits may be divided into various types according to power consumption performance and anti-noise performance of the Bandgaps. Usually, better anti-noise performance indicates poorer power consumption performance. For example, the Bandgaps may be divided into three types: 10 uA Bandgaps (having good anti-noise performance and applicable to various devices), 5 uA Bandgaps (having medium anti-noise performance and not applicable to a high-speed device such as a CPU or an RF), and 1 uA Bandgaps (having bad anti-noise performance and only applicable to a low-speed device). The 1 uA-type Bandgaps are a limit in the prior art, and cannot be designed smaller. However, the 1 uA-type Bandgaps consume excessive power for a wearable electronic device, which affects the development of wearable electronic devices.

SUMMARY

Forms of the present application provide the ability to reduce power consumption of a Bandgap based on supplying a stable voltage.

In some forms of the present application, a power supply circuit is provided, including: a bandgap voltage reference Bandgap, a real-time detection and control module, and an alternate voltage source module, where the real-time detection and control module is connected to the Bandgap and the alternate voltage source module. The real-time detection and control module is configured to adjust an output point voltage of the alternate voltage source module according to an output voltage of the Bandgap, and when the output point voltage of the alternate voltage source module reaches a target voltage, to supply power using the alternate voltage source module.

In some implementations, the alternate voltage source module has multiple output point voltages, where the multiple output point voltages are the same or different.

In some implementations, the power supply circuit includes multiple alternate voltage source modules, where the output point voltages of the multiple alternate voltage source modules are the same or different.

In some implementations, the real-time detection and control module includes a detection and control unit and a standard cell, where the detection and control unit is connected to the Bandgap and the standard cell, and is configured to adjust a bleeder circuit of the standard cell according to the output voltage of the Bandgap, so that a voltage of a marking point of the standard cell is equal to the output voltage of the Bandgap; and the real-time detection unit is configured to adjust a bleeder circuit of the alternate voltage source module according to the bleeder circuit of the standard cell so that the output point voltage of the alternate voltage source module reaches the target voltage.

In some implementations, the real-time detection and control module is configured to, when a power-supply duration of the alternate voltage source module reaches a preset duration, re-adjust the output point voltage of the alternate voltage source module according to the output voltage of the Bandgap so that the output point voltage of the alternate voltage source module reaches the target voltage.

In some implementations, the alternate voltage source module includes: a PMOS transistor, an NMOS transistor, a first resistor, a second resistor, and a capacitor, where a source and a drain of the PMOS transistor are respectively connected to an input high level and a first end of the first resistor; a source and a drain of the NMOS transistor are respectively connected to the ground and a second end of the second resistor; a second end of the first resistor is connected to a first end of the second resistor, where at least one of the first resistor or the second resistor is an adjustable resistor, and a control end of the adjustable resistor is connected to a resistance control end of the real-time detection and control module; the capacitor is connected to the ground and the first end of the second resistor; and an output point is located in the second resistor, and a ratio of a resistance value between the output point and the ground to that of the second resistor is equal to a ratio of the target voltage to the output voltage of the Bandgap.

In some implementations, the standard cell includes: a PMOS transistor, an NMOS transistor, a first resistor of the standard cell, and a second resistor of the standard cell, where a source and a drain of the PMOS transistor are respectively connected to an input high level and a first end of the first resistor of the standard cell; a source and a drain of the NMOS transistor are respectively connected to the ground and a second end of the second resistor of the standard cell; the first resistor of the standard cell is an adjustable resistor, and a control end of the first resistor of the standard cell is connected to a resistance control end of the detection and control unit; and the detection and control unit is configured to control and adjust a resistance value of the first resistor of the standard cell so that an output voltage of a second end of the first resistor of the standard cell and/or a first end of the second resistor of the standard cell is the same as the output voltage of the Bandgap.

In some implementations, the alternate voltage source module includes: a PMOS transistor, an NMOS transistor, a first resistor of the alternate voltage source module, a second resistor of the alternate voltage source module, and a capacitor, where a source and a drain of the PMOS transistor are respectively connected to an input high level and a first end of the first resistor of the alternate voltage source module; a source and a drain of the NMOS transistor are respectively connected to the ground and a second end of the second resistor of the alternate voltage source module; a second end of the first resistor of the alternate voltage source module is connected to a first end of the second resistor of the alternate voltage source module; the capacitor is connected to the ground and an output point of the alternate voltage source module, where the output point is located in the second resistor of the alternate voltage source module, and a ratio of a resistance value between the output point and the ground to that of the second resistor of the standard cell is equal to a ratio of the target voltage to the output voltage of the Bandgap; a resistance value of the second resistor of the alternate voltage source module is equal to that of the second resistor of the standard cell; and the first resistor of the alternate voltage source module is an adjustable resistor that connects a control end to the resistance control end of the detection and control unit, and the detection and control unit is configured to adjust a resistance value of the first resistor of the alternate voltage source module to be the same as that of the first resistor of the standard cell.

In some implementations, a second resistor $R_2$ of the alternate voltage source module is formed by multiple resistors $R_2, R_{22} \ldots, R_{2n}$ that are in serial connection, where n is a positive integer not less than 2. A first end of $R_{21}$ is connected to the second end of the first resistor of the alternate voltage source module, and a second end of $R_{21}$ is connected to a first end of $R_{22}$. A first end of $R_{2k}$ is connected to a second end of $R_{2(k-1)}$, and a second end of $R_{2k}$ is connected to a first end of $R_{2(k+1)}$, where k is a positive integer and 1<k<n. A first end of $R_{2n}$ is connected to a second end of $R_{2(n-1)}$, and a second end of $R_{2n}$ is connected to the drain of the NMOS. A first end of $R_{2j}$ is connected to the capacitor of which another end is grounded, where j is a positive integer and 1≤j≤n. Ratios of $R_{2j}+R_{2(j+1)}+ \ldots +R_{2n}$ to the second resistor of the standard cell are respectively equal to a ratio of a single target voltage to the output voltage of the Bandgap.

In some implementations, to adjust a bleeder circuit of the standard cell according to the output voltage of the Bandgap so that a voltage of a marking point of the standard cell is equal to the output voltage of the Bandgap, the detection and control unit is configured to: connect an output point of the Bandgap to the second end of the first resistor of the standard cell; and adjust the resistance value of the first resistor of the standard cell so that a current between the output point of the Bandgap and the second end of the first resistor of the standard cell is 0, where a voltage of the second end of the first resistor of the standard cell is the voltage of the marking point.

In some implementations, when the detection and control unit adjusts the first resistor of the standard cell and/or adjusts the first resistor of the alternate voltage source module, a gate of the PMOS transistor is in a low level, and a gate of the NMOS transistor is in a high level.

In some implementations, when power is supplied using the alternate voltage source module, control levels are respectively supplied to gates of the PMOS transistor and the NMOS transistor by means of a preset pulse, where the control levels supplied to the gates of the PMOS transistor and the NMOS transistor are contrary.

Such a power supply circuit can adjust an output point voltage of an alternate voltage source module according to an output voltage of a Bandgap, to further supply power using the alternate voltage source module. After adjustment of the output point voltage of the alternate voltage source module is completed, the Bandgap does not need to keep a power-supply state, and therefore power consumed by the Bandgap is reduced based on stable voltage supply.

In another aspect of this application, a power supply circuit forming method is provided, including: connecting a bandgap voltage reference Bandgap to a real-time detection and control module; connecting an alternate voltage source module to the real-time detection and control module, where the real-time detection and control module adjusts an output point voltage of the alternate voltage source module according to an output voltage of the Bandgap; and when the output point voltage of the alternate voltage source module reaches a target voltage, supplying power by using the alternate voltage source module.

In some implementations, the alternate voltage source module has multiple output point voltages, where the multiple output point voltages are the same or different.

In some implementations, the power supply circuit includes multiple alternate voltage source modules, where the output point voltages of the multiple alternate voltage source modules are the same or different.

In some implementations, forms of the method further include: generating the real-time detection and control module, including: generating a detection and control unit; and generating a standard cell; connecting the detection and control unit to the Bandgap and the standard cell; and connecting the detection and control unit to the alternate voltage source module.

In some implementations, the generating a standard cell includes: respectively connecting a source and a drain of a PMOS transistor to an input high level and a first end of a first resistor of the standard cell; respectively connecting a source and a drain of an NMOS transistor to the ground and a second end of a second resistor of the standard cell; connecting a second end of the first resistor of the standard cell to a first end of the second resistor of the standard cell, where the first resistor is an adjustable resistor; connecting a control end of the first resistor to a resistance control end of the detection and control unit; and connecting a capacitor to the ground and the first end of the second resistor.

In some implementations, the method further includes: generating the alternate voltage source module, including: respectively connecting the source and the drain of the PMOS transistor to the input high level and a first end of a first resistor of the alternate voltage source module; respectively connecting the source and the drain of the NMOS transistor to the ground and a second end of a second resistor of the alternate voltage source module; connecting a second end of the first resistor of the alternate voltage source module to a first end of the second resistor of the alternate voltage source module, where the first resistor is an adjustable resistor; connecting a control end of the first resistor to a resistance control end of the real-time detection and control module; connecting the capacitor to the ground and the first end of the second resistor of the alternate voltage source module; and setting an output point on the second resistor of the alternate voltage source module.

In some implementations, the method further includes: connecting a gate of a PMOS transistor to a pulse controller; and connecting a gate of an NMOS transistor to the pulse controller by using a phase inverter.

In some implementations, a gate of a PMOS transistor is connected to a pulse controller; and a gate of an NMOS transistor is connected to the pulse controller by using a phase inverter.

A power supply circuit generated by using such a method can adjust an output point voltage of an alternate voltage source module according to an output voltage of a Bandgap, to further supply power by using the alternate voltage source module. After adjustment of the output point voltage of the alternate voltage source module is completed, the Bandgap does not need to keep a power-supply state, and therefore power consumed by the Bandgap is reduced based on stable voltage supply.

According to still another aspect of this application, forms of a power supply circuit control method is provided, including: adjusting an output point voltage of an alternate voltage source module according to an output voltage of a bandgap voltage reference Bandgap; and when the output point voltage of the alternate voltage source module reaches a target voltage, supplying power by using the alternate voltage source module, where the alternate voltage source module has multiple output point voltages, where the multiple output point voltages are the same or different.

In some implementations, the power supply circuit includes multiple alternate voltage source modules, where the output point voltages of the multiple alternate voltage source modules are the same or different.

In some implementations, adjusting an output point voltage of an alternate voltage source module according to an output voltage of a bandgap voltage reference Bandgap includes: connecting an output point of the Bandgap to a marking point of a first resistor of a standard cell; adjusting a bleeder circuit of the standard cell so that a current between the output point of the Bandgap and the marking point of the first resistor of the standard cell is 0; and adjusting a bleeder circuit of the alternate voltage source module according to the bleeder circuit of the standard cell so that the output point voltage of the alternate voltage source module reaches the target voltage.

In some implementations, the method further includes: when a power-supply duration of the alternate voltage source module reaches a preset duration, re-adjusting the output point voltage of the alternate voltage source module according to the output voltage of the Bandgap so that the output point voltage of the alternate voltage source module reaches the target voltage.

In some implementations, adjusting a bleeder circuit of the standard cell so that a current between the output point of the Bandgap and the marking point of the first resistor of the standard cell is 0 includes: outputting a low level to a gate of a PMOS transistor of the standard cell, and supplying a high level to a gate of an NMOS transistor of the standard cell; adjusting a resistance value of the first resistor of the standard cell, so that the current between the output point of the Bandgap and the marking point of the standard cell is 0, where the output point of the Bandgap is connected to a second end of the first resistor of the standard cell; and the standard cell includes: the PMOS transistor, the NMOS transistor, the first resistor of the standard cell, and a second resistor of the standard cell, where a source and a drain of the PMOS transistor are respectively connected to an input high level and a first end of the first resistor of the standard cell; a source and a drain of the NMOS transistor are respectively connected to the ground and a second end of the second resistor of the standard cell; the second end of the first resistor of the standard cell is connected to a first end of the second resistor of the standard cell, where the first resistor of the standard cell is an adjustable resistor; and a capacitor is connected to the ground and the first end of the second resistor, where the second end of the first resistor and/or the first end of the second resistor is the marking point of the standard cell.

Optionally, adjusting a bleeder circuit of the alternate voltage source module according to the bleeder circuit of the standard cell, so that the output point voltage of the alternate voltage source module reaches the target voltage includes: supplying a low level to a gate of a PMOS transistor of the alternate voltage source module, and supplying a high level to a gate of an NMOS transistor of the standard cell; and adjusting a resistance value of a first resistor of the alternate voltage source module, so that the resistance value of the first resistor of the alternate voltage source module is equal to that of the first resistor of the standard cell, and the alternate voltage source module includes: the PMOS transistor, an NMOS transistor, a capacitor, the first resistor of the alternate voltage source module, and a second resistor of the alternate voltage source module, where a resistance value of the second resistor of the alternate voltage source module is equal to that of the second resistor of the standard cell, and a source and a drain of the PMOS transistor are respectively connected to an input high level and a first end of the first resistor of the alternate voltage source module; a source and a drain of the NMOS transistor are respectively connected to the ground and a second end of the second resistor of the alternate voltage source module; a second end of the first resistor of the alternate voltage source module is connected to a first end of the second resistor of the alternate voltage source module, where the first resistor of the alternate voltage source module is an adjustable resistor; and the capacitor is connected to the ground and an output point of the alternate voltage source module, where the output point is located in the second resistor of the alternate voltage source module, and a ratio of a resistance value between the output point and the ground to that of the second resistor of the standard cell is equal to a ratio of the target voltage to the output voltage of the Bandgap.

In some implementations, the method further includes: when power is supplied using the alternate voltage source module, respectively outputting control levels to the gates of the PMOS transistor and the NMOS transistor by means of a preset pulse, where the control levels supplied to the gates of the PMOS transistor and the NMOS transistor are contrary.

In such a control method, a power supply circuit can adjust an output point voltage of an alternate voltage source module according to an output voltage of a Bandgap, to further supply power by using the alternate voltage source module. After adjustment of the output voltage of the alternate voltage source module is completed, the Bandgap does not need to keep a power-supply state, and therefore power consumed by the Bandgap is reduced based on stable voltage supply.

BRIEF DESCRIPTION OF THE DRAWINGS

The accompanying drawings described herein are intended to provide further understanding of the present disclosure and are considered part of this application. The exemplary embodiments and implementations of the present disclosure and description thereof are intended to explain the present disclosure, and not to constitute an improper limitation to the present disclosure. In the accompanying drawings.

DETAILED DESCRIPTION

The technical solutions of the present disclosure are further described in detail with reference to accompanying drawings and embodiments as follows:

The following describes various exemplary embodiments and implementations of this application in detail with reference to the accompanying drawings. It should be noted that the relative arrangement of the components and steps, the numerical expressions, and numerical values set forth in these embodiments should not be construed as limitations to the scope of this application unless specifically stated otherwise.

In addition, it should be understood that for ease of description, the sizes of the components shown in the accompanying drawings are not necessarily drawn in actual proportion. For example, thickness or width of some layers may be exaggerated relative to another layer.

The descriptions of the exemplary embodiments below are merely illustrative, and are not used to limit this application and application or usage thereof at any circumstance.

Technologies, methods, and apparatuses that are already known by a person of ordinary skill in the related art may not be discussed in detail. However, these technologies, methods, and apparatuses should be considered as a part of this specification when being applicable to this specification.

It should be noted that similar numerals and letters in the following accompany drawings represent similar items. Therefore, once an item is defined or described in an accompany drawing, the item does not need to be further discussed in a subsequent description of drawings.

Figure 1A:
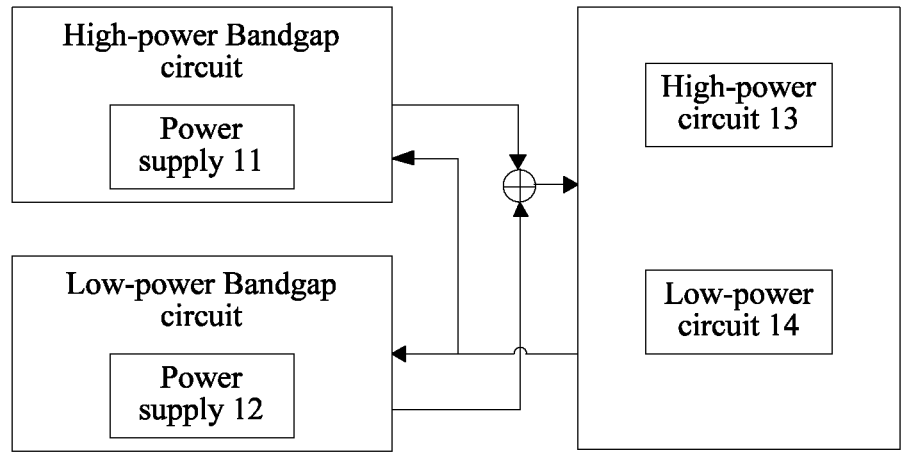
FIG. 1A is a schematic diagram of supplying power using a Bandgap in the prior art.
Figure 1B:
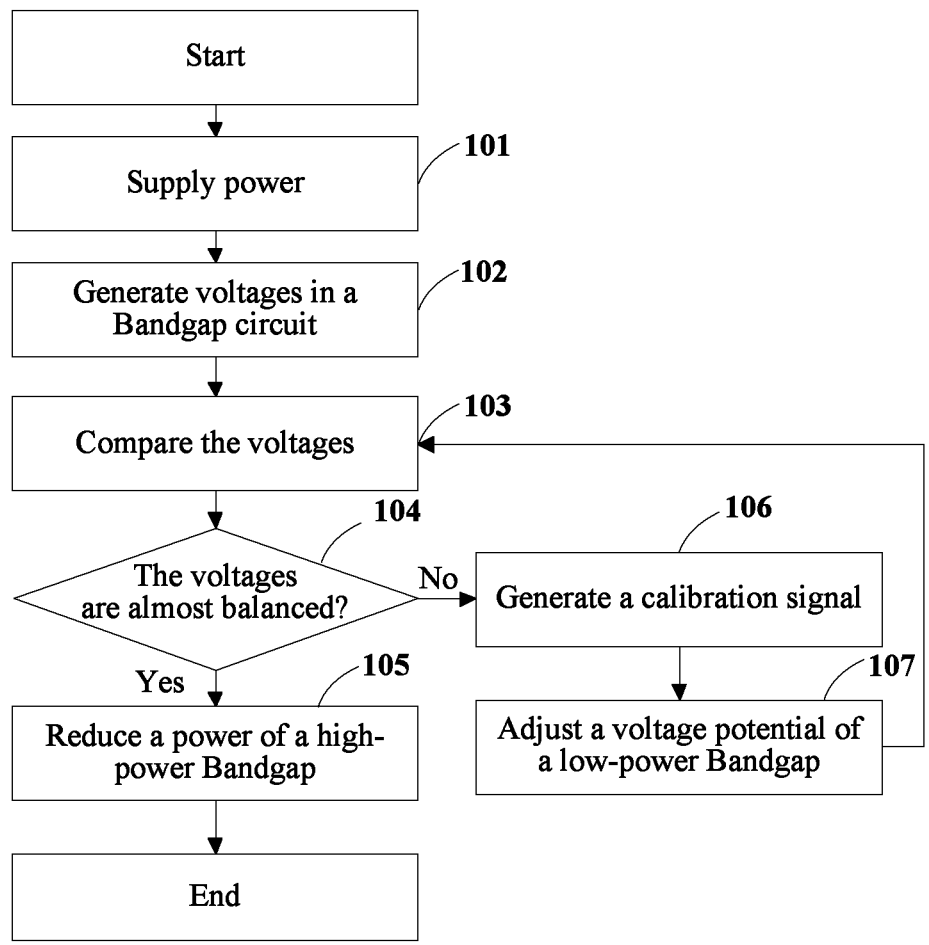
FIG. 1B is a flowchart for supplying power using a Bandgap in the prior art.
Figure 1C:
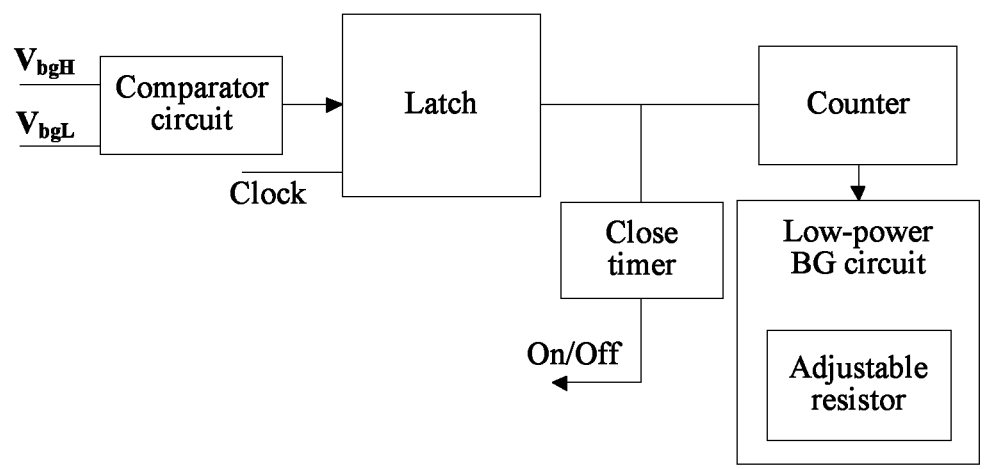
FIG. 1C is a diagram of a circuit module for supplying power using a Bandgap in the prior art.
Figure 1D:
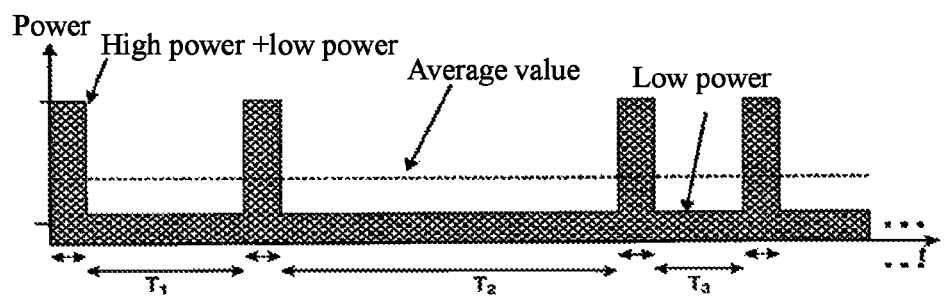
FIG. 1D is a schematic diagram of power consumption of supplying power using a Bandgap in the prior art.

As shown in FIG. 1A to FIG. 1D, to reduce power that is consumed using a Bandgap, a solution is provided in the U.S. Pat. No. 7,579,822, that is, a high-power Bandgap circuit and a low-power Bandgap circuit are set. It can be seen from steps 101 to 107 in FIG. 1B that a solution in the prior art is to supply power by using a high-power Bandgap circuit and/or a low-power Bandgap circuit, so that when an excessive high power is not required, a voltage can be supplied by using a low-power Bandgap circuit, thereby reducing a power loss of the Bandgap. A specific power loss status is shown in FIG. 1D. The low-power Bandgap circuit is in a continuous power-supply state. When a high power is required, a high-power Bandgap circuit is activated. Usually, a current of a conventional high-power Bandgap circuit is approximately 5 uA, and usually, a current of a low-power Bandgap circuit is approximately 1 uA. Therefore, an average current is between 1 and 5 uA.

Figure 2:
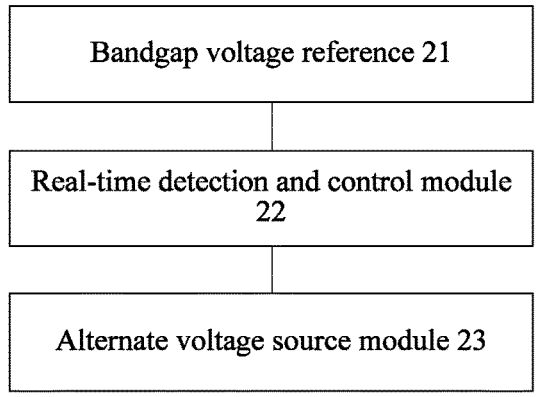
FIG. 2 is a schematic diagram of one form of a power supply circuit.

FIG. 2 is a schematic diagram of one implementation of a power supply circuit. A Bandgap 21 is connected to a real-time detection and control module 22, and the real-time detection and control module 22 is connected to the alternate voltage source module 23. The real-time detection and control module can adjust an output point voltage of the alternate voltage source module according to an output voltage of the Bandgap, and adjusts a circuit parameter of the alternate voltage source module, so that the output point voltage of the alternate voltage source module reaches a target voltage. The target voltage may be the same as the output voltage of the Bandgap, or may have a multiple relationship with, for example, the output voltage of the Bandgap. In an embodiment, the output point voltage of the alternate voltage source module may be adjusted by adjusting a bleeder resistance of the alternate voltage source module. When the output point voltage of the alternate voltage source module is the same as the output voltage of the Bandgap, the real-time detection and control module closes the Bandgap and supplies power by using the alternate voltage source module.

Such a power supply circuit can adjust an output point voltage of an alternate voltage source module according to an output voltage of a Bandgap, to further supply power by using the alternate voltage source module. After adjustment of the output point voltage of the alternate voltage source module is completed, the Bandgap does not need to keep a power-supply state, and therefore power consumed by the Bandgap is reduced based on stable voltage supply.

Figure 3:
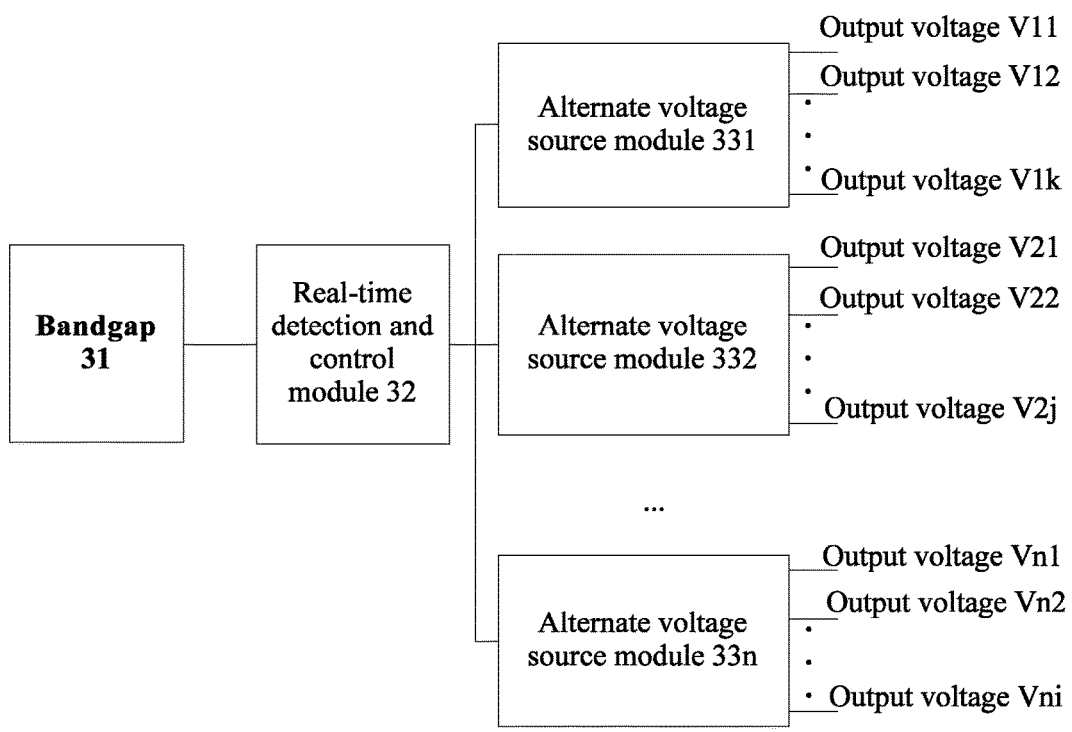
FIG. 3 is a schematic diagram of another form of a power supply circuit.

In some implementations, as shown in FIG. 3, the alternate voltage source module 331 may have multiple output point voltages such as V11 to V1$k$, where k is a positive integer. The multiple output point voltages may be the same voltage or different voltages. Such a power supply circuit can supply, at a same time, reference voltages to multiple required electrical equipment or modules that have the same or different voltages, thereby reducing a quantity of Bandgaps required in a device.

In some implementations, as shown in FIG. 3, a power supply circuit includes multiple alternate voltage source modules 331 to 33$n$, where n is a positive integer. Output point voltages of the multiple alternate voltage source modules are the same or different. Such a power supply circuit can supply, at a same time, reference voltages to multiple required electrical equipment or modules that have the same or different voltages, thereby reducing a quantity of Bandgaps required in a device.

In some implementations, as shown in FIG. 3, a power supply circuit includes multiple alternate voltage source modules 331 to 33$n$, where n is a positive integer. The multiple alternate voltage source modules may have multiple output point voltages such as V11 to V1$k$, V21 to V2$j$ . . . , Vn1 to Vn$i$, where k, j, and l are positive integers. Such a power supply circuit can supply, at a same time, reference voltages to multiple required electrical equipment or modules that have the same or different voltages. When distances among the electrical equipment or the modules are relatively short, power may be supplied by using different interfaces of a single alternate voltage source module, thereby reducing a volume of the power supply circuit. When distances among different electrical equipment or modules are relatively long, power is supplied by using different alternate voltage source modules, thereby reducing voltage attenuation of the power supply circuit and improving voltage accuracy.

Figure 4:
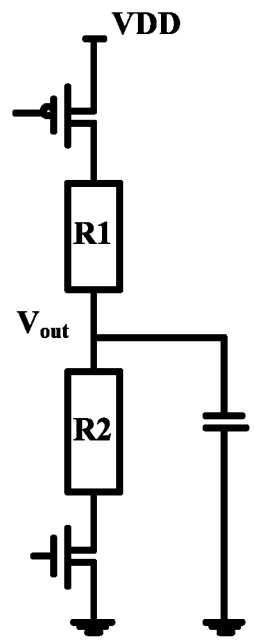
FIG. 4 is a schematic diagram of an alternate voltage source module of a power supply circuit.

FIG. 4 is a schematic diagram of an alternate voltage source module, including a PMOS transistor, an NMOS transistor, a first resistor $R_1$, a second resistor $R_2$, and a capacitor. A marking point of the alternate voltage source module is between R1 and R2, and a voltage of the marking point is $V_0$. $R_1$ is connected to a high level VDD by using the PMOS transistor, and $R_2$ is grounded by using the NMOS transistor. An output point is further connected to the capacitor of which another end is grounded. At least one of R1 or R2 is an adjustable resistor. According to a formula:

$$V_0=R_2*VDD/(R_1+R_2),$$

a resistance value of the adjustable resistor is adjusted, so that $V_{out}$ is the same as an output voltage of a Bandgap $V_{BG}$.

Different output points may be set on $R_2$. An output point voltage is $V_{out}$, and a resistance value of a resistor between an output point and the ground is $R_3$:

$$R_3/R_2=V_{out}/V_0=V_{out}/V_{BG}.$$

Such an alternate voltage source module can adjust $V_0$ by using divided voltages of the resistors R1 and R2, so that $V_0$ is the same as $V_{BG}$, and further uses the divided voltage of R2 to ensure that a power supply circuit can meet a requirement of an electrical equipment. In an embodiment, R1 and R2 may be circuit modules that are capable of dividing voltages, and are not limited to an adjustable resistor.

Figure 5:
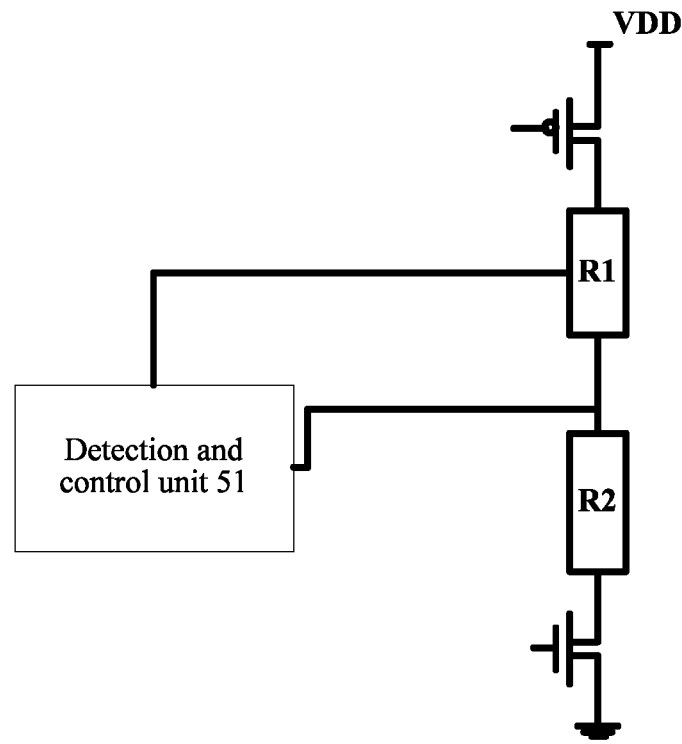
FIG. 5 is a schematic diagram of a real-time detection and control module of a power supply circuit.

FIG. 5 is a schematic diagram of one implementation of a real-time detection and control module. The real-time detection and control module may include a detection and control unit 51 and a standard cell. The detection and control unit is connected to a Bandgap and the standard cell, and adjusts a bleeder circuit of the standard cell according to an output voltage of the Bandgap, so that a voltage of a marking point of the standard cell is equal to the output voltage of the Bandgap. A detection unit adjusts a bleeder circuit of an alternate voltage source module according to the bleeder circuit of the standard cell, so that an output point voltage of the alternate voltage source module reaches a target voltage. As shown in FIG. 5, the standard cell includes a PMOS transistor, an NMOS transistor, a first resistor $R_1$ of the standard cell, a second resistor $R_2$ of the standard cell, and a capacitor. A marking point of the standard cell is between R1 and R2, and an output voltage is $V_1$. $R_1$ is connected to a high level VDD by using the PMOS transistor, and $R_2$ is grounded by using the NMOS transistor. $R_1$ is an adjustable resistor. According to a formula:

$$V_1=R_2*VDD/(R_1+R_2),$$

$R_1$ is adjusted, so that $V_1$ is the same as the output voltage of the Bandgap.

The detection and control unit may connect an output point of the Bandgap to the marking point of the standard cell, and determine a voltage drop according to a magnitude of a current between the output point of the Bandgap and the marking point of the standard cell. If the magnitude of the current is not 0, $R_1$ is adjusted, so that the current between the output point of the Bandgap and the marking point of the standard cell is 0. When the current is 0, the real-time detection and control module completes voltage calibration of the standard cell, and disconnects the output point of the Bandgap to an output point of the standard cell. In some implementations, a resistor may exist between the output point of the Bandgap and the output point of the standard cell, to prevent a device from being damaged by an excessive current due to an excessive voltage difference.

Such a power supply circuit can accurately determine, by means of current detection, whether an output voltage of a Bandgap is the same as a voltage of a standard cell, and further adjusts an alternate voltage source module according to a parameter of the standard cell, thereby improving accuracy of an output point voltage of the alternate voltage source module, and ensuring that the power supply circuit meets a requirement of an electrical equipment.

Figure 6:
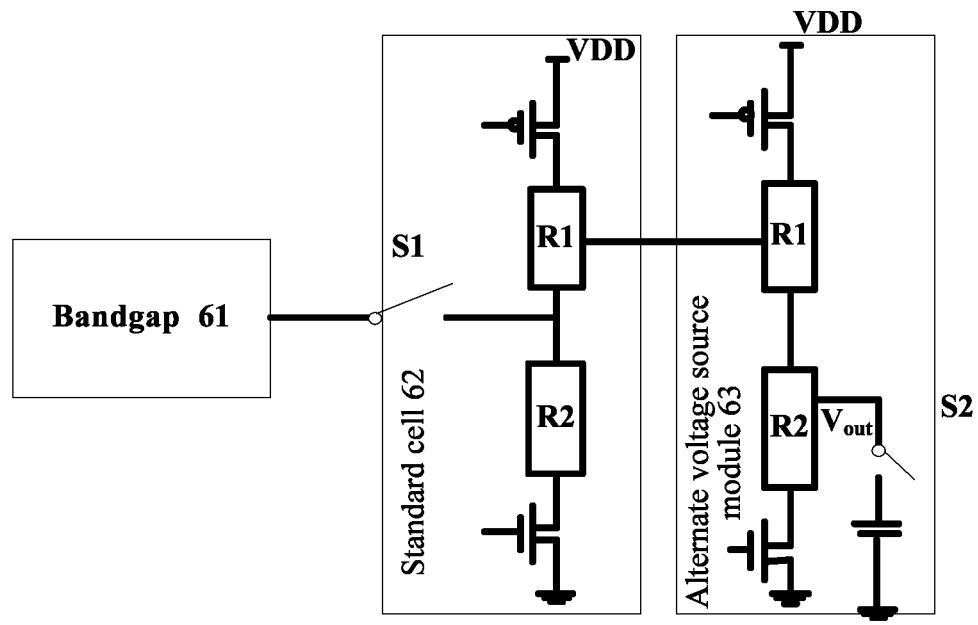
FIG. 6 is a diagram of a principle of a power supply circuit.

FIG. 6 is a diagram of one implementation of a principle of a power supply circuit. In a phase in which voltage calibration is performed on a marking point of a standard cell 62, S1 is closed, and S2 is disconnected. A gate of a PMOS transistor in the figure is in a low level, and a gate of an NMOS transistor is in a high level. A connection line between two $R_1$ in the figure indicates that both resistors of the two can be adjusted and resistance values are always equal. Resistance values of a second resistor $R_2$ of the standard cell 62 is equal to that of a second resistor $R_2$ of an alternate voltage source module 63. An output point of the alternate voltage source module 63 is located in the second resistor of the alternate voltage source module, and a ratio of a resistance value $R_x$ between the output point and the ground to that of the second resistor $R_2$ of the standard cell is equal to a ratio of a target voltage $V_{out}$ to an output voltage of a Bandgap $V_{BG}$, that is:

$$V_{out}=R_x*VDD/(R_1+R_2),$$

$$V_{BG}=V_1=R_2*VDD/(R_1+R_2),$$

and therefore, $V_{BG}/V_{out}=R_x/R_2$.

In some implementations, $R_1$ may be adjusted in the manner of the implementation shown in FIG. 5, so that the voltage of the marking point of the standard cell is equal to the output voltage of the Bandgap.

Such a power supply circuit can adjust $V_{out}$ by using divided voltages of resistors $R_1$ and $R_2$, and obtains a target voltage by using a ratio of the resistors, thereby ensuring that the power supply circuit meets a requirement of an electrical equipment. In addition, distances among an alternate voltage source module and a standard cell and a Bandgap may be prolonged, so that the alternate voltage source module can supply power to a device in a short distance, thereby avoiding voltage attenuation and improving accuracy. In an embodiment, $R_1$ and $R_2$ may be circuit modules that are capable of dividing voltages, and are not limited to an adjustable resistor.

In some implementations, after adjustment of $R_1$ is completed, a high level is supplied to the gate of the PMOS transistor of the standard cell, and a low level is supplied to the gate of the NMOS transistor of the standard cell, so that the standard cell stops working, and energy is further saved.

In some implementations, as shown in FIG. 6, an output point is connected to a capacitor of which another end is grounded.

In a resistor adjustment phase, a gate of a PMOS transistor of the alternate voltage source module is in a low level, and a gate of an NMOS transistor is in a high level. When $V_{out}$ exceeds a preset higher threshold, a voltage supplied to the gate of the MOS transistor is adjusted, so that the gate of the PMOS transistor is in a high level, the gate of the NMOS transistor is in a low level, and a capacitor discharges. When $V_{out}$ is lower than a preset lower threshold, a voltage supplied to the gate of the MOS transistor is adjusted, so that the gate of the PMOS transistor is in a low level, the gate of the NMOS transistor is in a high level, and the capacitor charges. Therefore, $V_{out}$ is stabilized between the preset lower threshold and the preset higher threshold. On the one hand, performance of an electrical equipment is ensured. On the other hand, the electrical equipment is prevented from being damaged due to voltage instability.

Figure 14A:
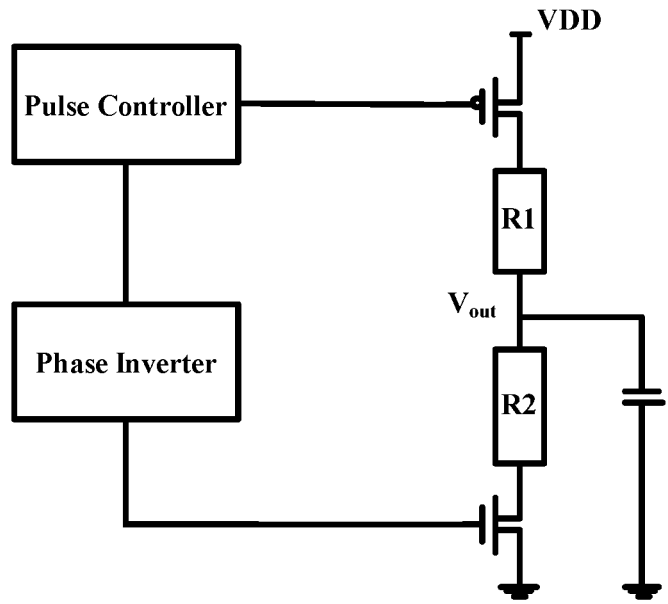
FIG. 14A is a schematic diagram of an alternate voltage source module of a power supply circuit.
Figure 14B:
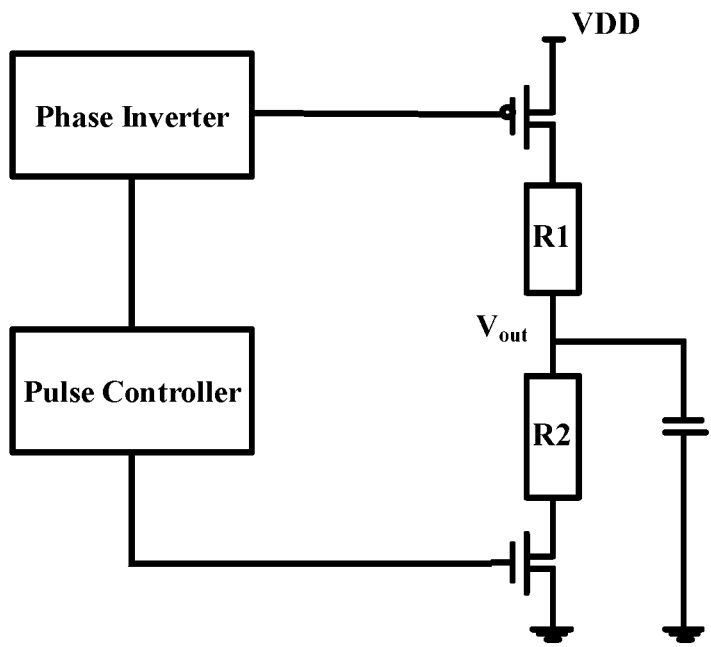
FIG. 14B is a schematic diagram of an alternate voltage source module of a power supply circuit.

In some implementations, an adjustment period of a level of the gate of the MOS transistor may be determined by means of simulation or a test, to further supply a level to the gate of the MOS transistor using a pulse signal. In some implementations as shown in FIG. 14A and FIG. 14B, a pulse signal may be provided by a pulse controller using a same clock signal, and the pulse controller is connected to one of the gate of the PMOS transistor or the gate of the NMOS transistor of the alternate voltage source module, and connected to another one by using a phase inverter. Such a power supply circuit does not need to detect $V_{out}$ in real time, thereby reducing a calculation burden of a real-time detection and control module and reducing complexity of the circuit.

In some implementations, to avoid a problem that because a clock signal is not that accurate, errors gradually accumulate as time passes, leading to that an output point voltage is not that accurate, a preset duration may be set. When power is supplied by using an alternate voltage source module for the preset duration, a Bandgap may be re-connected to a standard cell to perform calibration on a bleeder resistance, and resistance values of a first resistor of the standard cell and a first resistor of an alternate voltage source, so that accuracy and stability of an output voltage is further ensured. In some implementations, a pulse signal may be provided by using a second clock signal, and the clock signal is connected to one of a gate of a PMOS transistor or a gate of an NMOS transistor of the standard cell, and connected to another by using a phase inverter. A period of the pulse signal is not greater than a preset duration.

Such a power supply circuit can be calibrated in a timely manner by using a clock signal, thereby reducing a calculation burden of a real-time detection and control module and reducing complexity of the circuit.

Figure 7:
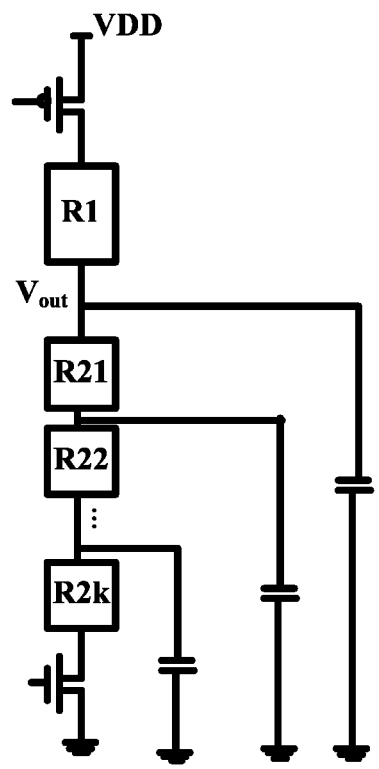
FIG. 7 is a schematic diagram of an alternate voltage source module of a power supply circuit.

FIG. 7 is a schematic diagram of an alternate voltage source module of a power supply circuit. A second resistor $R_2$ of the alternate voltage source module is formed by multiple resistors $R_2$, $R_{22}$ . . . , $R_{2n}$ that are in serial connection, where n is a positive integer not less than 2. A first end of $R_{21}$ is connected to a second end of a first resistor of the alternate voltage source module, and a second end $R_{21}$ is connected to a first end of $R_{22}$. A first end of $R_{2k}$ is connected to a second end of $R_{2(k-1)}$, and a second end of $R_{2k}$ is connected to a first end of $R_{2(k+1)}$, where k is a positive integer and 1<k<n. A first end of $R_{2n}$ is connected to a second end of $R_{2(n-1)}$, and a second end of $R_{2n}$ is connected to a drain of an NMOS. A first end of $R_{2j}$ is connected to a capacitor of which another end is grounded, where j is a positive integer and 1≤j≤n. The first end of $R_{2j}$ is an output point. To ensure that a target voltage $V_{outj}$ is obtained, it needs to be set that:

$$(R_{2j}+R_{2(j+1)}+ \ldots +R_{2n})/R_2=V_{outj}/V_{BG}.$$

In such a power supply circuit, a single alternate voltage source module can output multiple target voltages, so that power consumption requirements of different electrical equipment or different modules of the electrical equipment are met, and a volume of the power supply circuit is greatly reduced, and is conducive for the device to be miniature and portable.

Figure 8:
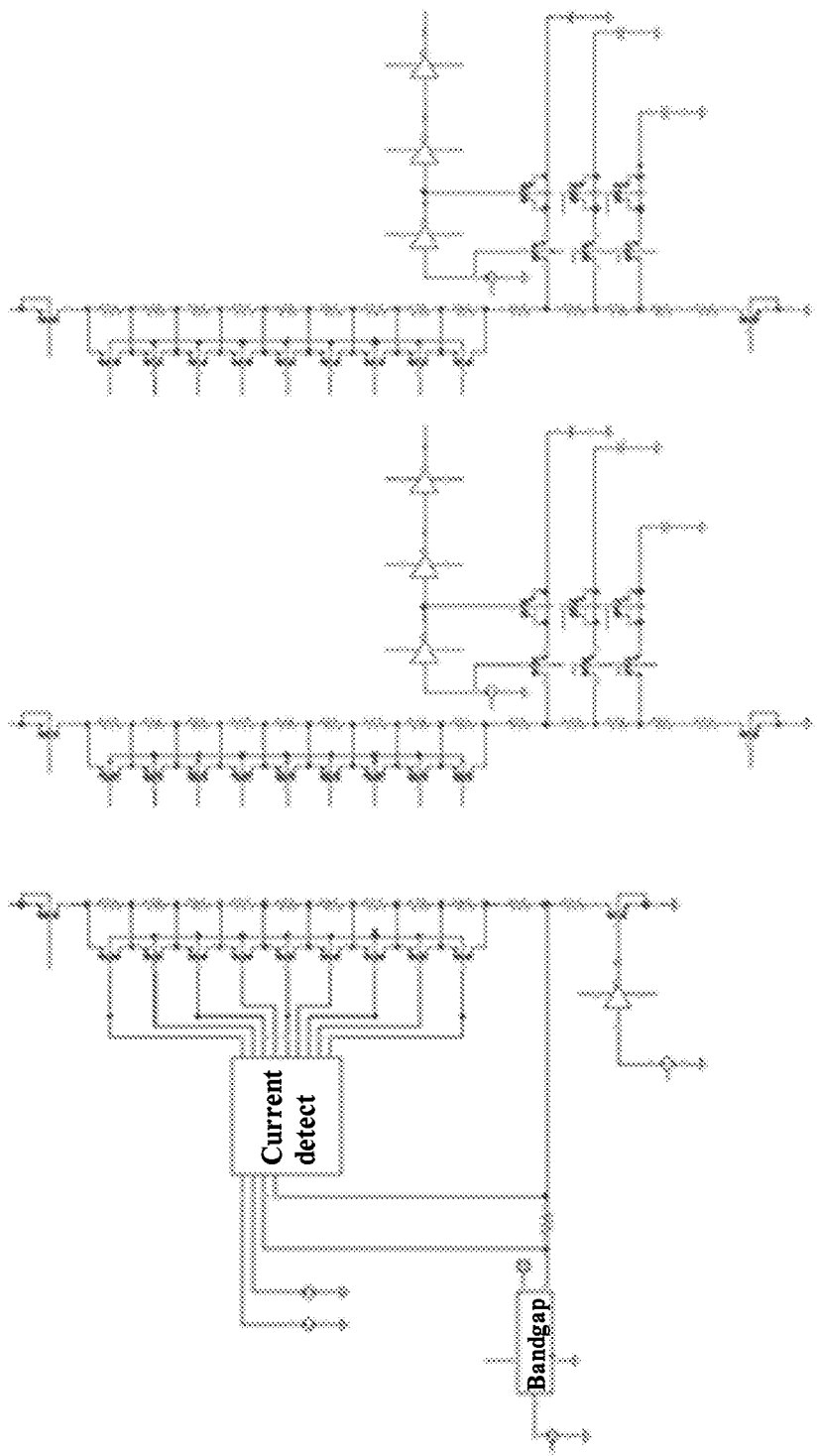
FIG. 8 is a simulation diagram of a power supply circuit.
Figure 9:
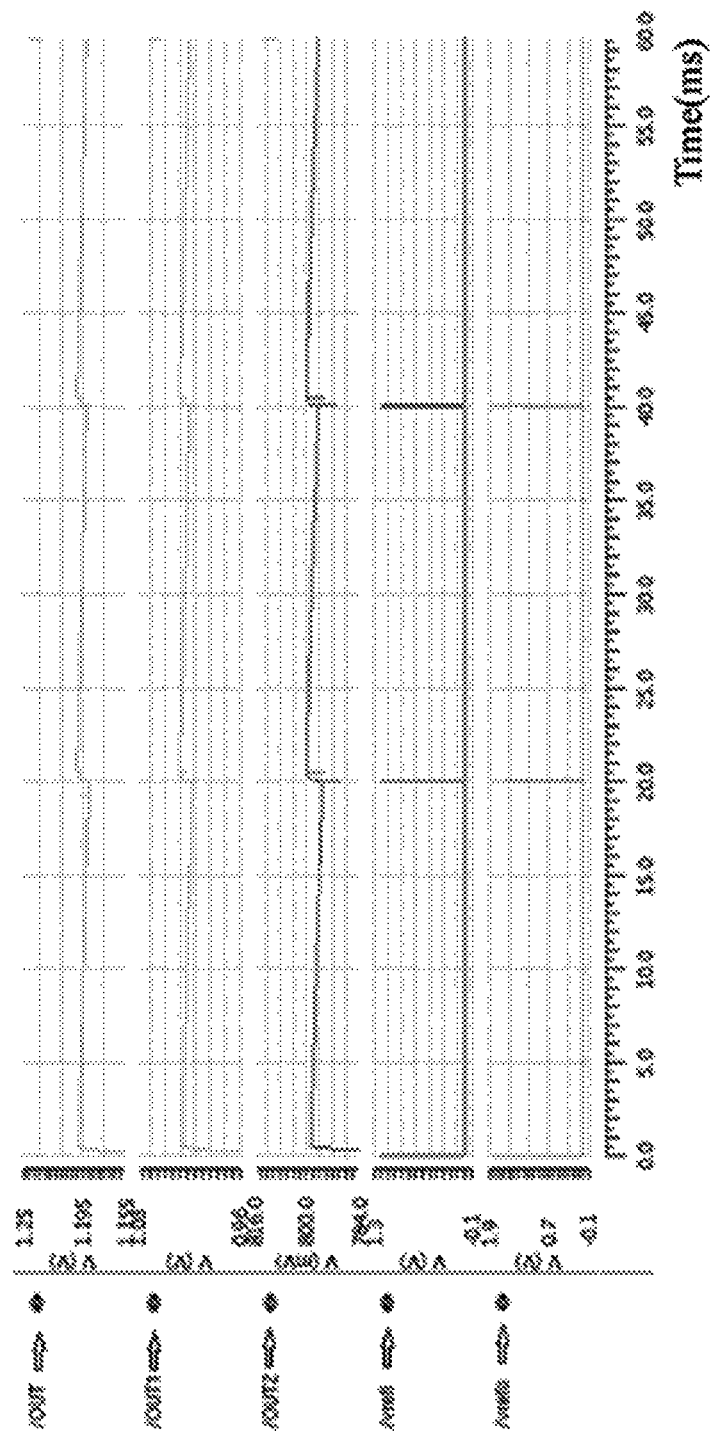
FIG. 9 is a diagram of simulation results of the power supply circuit shown in FIG. 8.
Figure 10:
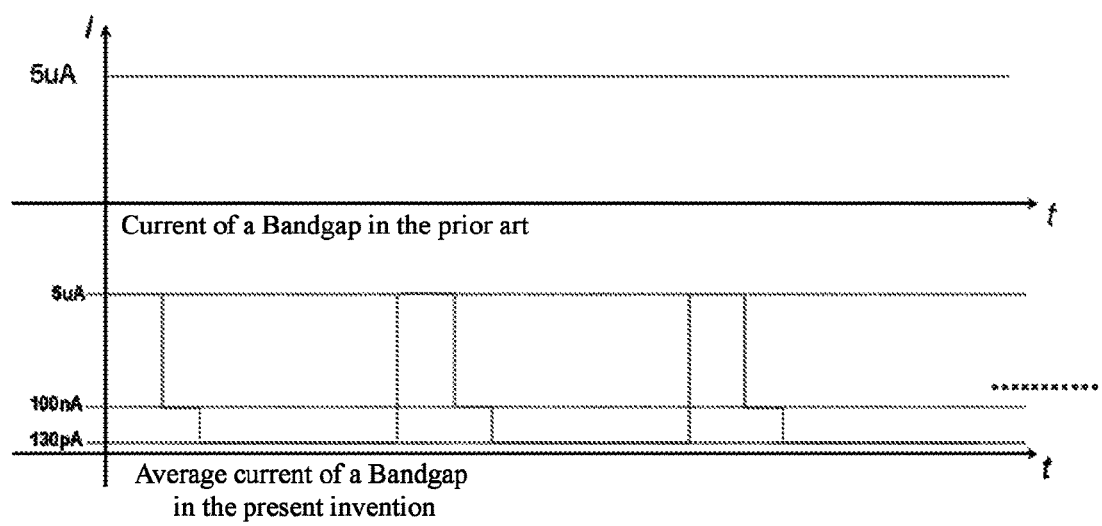
FIG. 10 is a diagram of comparison of energy consumed by supplying power using a Bandgap in the prior art with energy consumed using a form of a power supply circuit in the present disclosure.

FIG. 8 is a simulation diagram of a power supply circuit, and FIG. 9 is a diagram of a simulation result. In the figure, OUT, OUT1, and OUT2 are respectively output point voltages of three different points. It can be seen that the output point voltages are stable in a range, and the three output point voltages are different. vrefi and vrefo are respectively a control clock signal of an MOS transistor in a standard cell and a control clock signal of an MOS transistor in an alternate voltage source module. It can be seen that when a clock signal sends a pulse, an output point voltage is re-adjusted and is slowly reduced later. FIG. 10 is a diagram of current loss comparison between supplying power by using a Bandgap in the prior art with supplying power by using a power supply circuit in the present invention. It can be seen from FIG. 10 that, voltages that are output from the Bandgap of the present invention are apparently reduced. When power is supplied by using the alternate voltage source module, an energy loss is generated by the Bandgap only due to cases such as current leakage, thereby greatly reducing power consumed by the Bandgap, and improving an available duration of the Bandgap in an electrical equipment. For example, when power consumption of a single Bandgap is 5 uA, an average current is approximately 3 nA when one alternate voltage source module is used. When N Bandgaps are required, current in a conventional method is 5N uA. However, in this method, because only N bleeder circuits are added, and average current of each bleeder circuit is 2.5 nA, total current is approximately (0.5+2.5N) nA. Therefore, in the present invention, more power consumption can be reduced when more output voltages are required.

Figure 11:
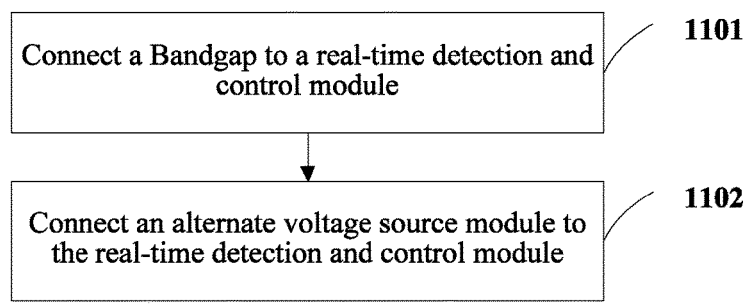
FIG. 11 is a flowchart of one form of a power supply circuit forming method.

FIG. 11 is a flowchart of a power supply circuit forming method.

Step 1101: Connect a bandgap voltage reference Bandgap to a real-time detection and control module.

Step 1102: Connect an alternate voltage source module to the real-time detection and control module. The real-time detection and control module can adjust an output point voltage of the alternate voltage source module according to an output voltage of the Bandgap. When the output point voltage of the alternate voltage source module reaches a target voltage, the real-time detection and control module closes the Bandgap and supplies power by using the alternate voltage source module.

A power supply circuit generated by using such a method can perform calibration on an output point voltage of an alternate voltage source module of according to an output voltage of a Bandgap, and further supplies power by using the alternate voltage source module. After voltage calibration is completed, the Bandgap does not need to keep a power-supply state, and therefore power consumed by the Bandgap is reduced based on stable voltage supply.

An alternate voltage source module is shown in FIG. 4. A process of generating an alternate voltage source module includes: respectively connecting a source and a drain of a PMOS transistor to an input high level and a first end of a first resistor; respectively connecting a source and a drain of an NMOS transistor to the ground and a second end of a second resistor; connecting a second end of the first resistor to a first end of the second resistor, where at least one of the first resistor or the second resistor is an adjustable resistor; connecting a control end of the adjustable resistor to a resistance control end of a real-time detection and control module; and connecting a capacitor to the ground and the first end of the second resistor.

An alternate voltage source module that is generated using such a method can use divided voltages of a first resistor and a second resistor to adjust an output point voltage of the alternate voltage source module, so that an output voltage of the alternate voltage source module is the same as an output voltage of a Bandgap, to ensure that a power supply circuit meets a requirement of an electrical equipment that requires the output voltage of the Bandgap.

FIG. 5 is a schematic diagram of one implementations of a real-time detection and control module. A process of generating a standard cell of a real-time detection and control module includes: respectively connecting a source and a drain of a PMOS transistor to an input high level and a first end of a first resistor; respectively connecting a source and a drain of an NMOS transistor to the ground and a second end of a second resistor; connecting a second end of the first resistor to a first end of the second resistor, where the first resistor is an adjustable resistor; and connecting a control end of the adjustable resistor to a resistance control end of a detection and control unit.

In such a method, a circuit that has a voltage value that is the same as an output voltage of the Bandgap can be generated, and a resistance of an alternate voltage source module can be adjusted according to a resistance value of the circuit, thereby improving accuracy of an output point voltage of the generated alternate voltage source module, and ensuring that a power supply circuit meets various power-consumption requirements of an electrical equipment.

Figure 12:
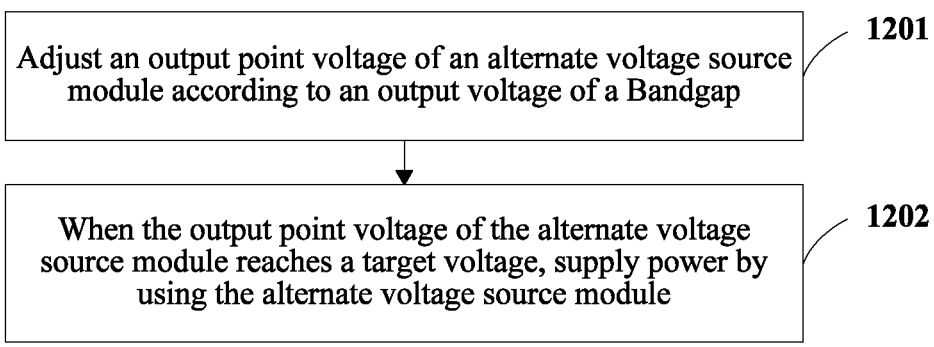
FIG. 12 is a flowchart of another form of a power supply circuit control method.

FIG. 12 is a flowchart of one method of a power supply circuit control method.

Step 1201: Adjust an output point voltage of an alternate voltage source module according to an output voltage of a bandgap voltage reference Bandgap, so that the output point voltage of the alternate voltage source module reaches a target voltage. For example, the output point voltage is adjusted by adjusting a bleeder resistance of the alternate voltage source module.

Step 1202: When the output point voltage of the alternate voltage source module reaches the target voltage, close the Bandgap and supply power by using the alternate voltage source module.

In such a control method, a power supply circuit can perform calibration on an output point voltage of an alternate voltage source module of according to an output voltage of a Bandgap, and further supplies power by using the alternate voltage source module. After voltage calibration is completed, the Bandgap does not need to keep a power-supply state, and therefore power consumed by the Bandgap is reduced based on stable voltage supply.

In some implementations, an output point of the Bandgap may be connected to an output point of the alternate voltage source module, and a voltage drop is determined according to a magnitude of a current between the output point of the Bandgap and the output point of the alternate voltage source module. If the magnitude of the current is not 0, the alternate voltage source module is adjusted. For example, a magnitude of the bleeder resistance of the alternate voltage source module is adjusted, so that a current between a marking point of the Bandgap and the output point of the alternate voltage source module is 0. When the current is 0, voltage calibration is completed, the output point of the Bandgap is disconnected to a marking point of the alternate voltage source module, and power is supplied to the outside by using the alternate voltage source module. The output point of the alternate voltage source module is located between the marking point and the ground.

In such a control method, a power supply circuit can accurately determine, by means of current detection, whether a voltage of an output point of a Bandgap is the same as that of an output point of the alternate voltage source module, thereby improving accuracy of an output voltage of the alternate voltage source module, and ensuring that the power supply circuit meets a requirement of an electrical equipment.

In some implementations, a power supply circuit may include a standard cell. A bleeder circuit of the standard cell may be adjusted according to an output voltage of a Bandgap, so that a voltage of a marking point of the standard cell is equal to the output voltage of the Bandgap. Then, a bleeder circuit of an alternate voltage source module is adjusted according to the bleeder circuit of the standard cell, so that an output point voltage of the alternate voltage source module reaches a target voltage.

In such a control method, a power supply circuit can accurately determine, by means of current detection, whether an output voltage of a Bandgap is the same as a voltage of a standard cell, and further adjusts an alternate voltage source module according to a parameter of the standard cell, thereby improving accuracy of an output voltage of the alternate voltage source module, and ensuring that a power supply circuit meets a requirement of an electrical equipment.

In some implementations, as shown in FIG. 6, in a phase in which voltage calibration is performed on a marking point of a standard cell 62, a gate of a PMOS transistor is controlled to be in a low level, and a gate of an NMOS transistor is controlled to be in a high level. Two $R_1$ are adjusted, so that resistance values of the two are always equal. Resistance values of a second resistor $R_2$ of the standard cell is equal to that of a second resistor $R_2$ of an alternate voltage source module.

In such a control method, a power supply circuit can adjust $V_{out}$ by using divided voltages of resistors $R_1$ and $R_2$, and obtains a target voltage by using a ratio of the resistors, thereby ensuring that the power supply circuit meets a requirement of an electrical equipment. In addition, distances among an alternate voltage source module and a standard cell and a Bandgap may be prolonged, so that the alternate voltage source module can supply power to a device in a short distance, thereby avoiding voltage attenuation and improving accuracy.

In some implementations, after adjustment of $R_1$ is completed, a high level is controlled to be supplied to the gate of the PMOS transistor of the standard cell, and a low level is controlled to be supplied to the gate of the NMOS transistor of the standard cell, so that the standard cell stops working, and energy is further saved.

In some implementations, as shown in FIG. 6, an output point is connected to a capacitor of which another end is grounded.

In a resistor adjustment phase, a gate of a PMOS transistor of the alternate voltage source module is in a low level, and a gate of an NMOS transistor is in a high level. When $V_{out}$ exceeds a preset higher threshold, a voltage supplied the gate of the MOS transistor is adjusted, so that the gate of the PMOS transistor is in a high level, the gate of the NMOS transistor is in a low level, and a capacitor discharges. When $V_{out}$ is lower than a preset lower threshold, a voltage supplied to the gate of the MOS transistor is adjusted, so that the gate of the PMOS transistor is in a low level, the gate of the NMOS transistor is in a high level, and the capacitor charges. Therefore, $V_{out}$ is stabilized between the preset lower threshold and the preset higher threshold. On the one hand, performance of an electrical equipment is ensured. On the other hand, the electrical equipment is prevented from being damaged due to voltage instability.

In some implementations, an adjustment period of a level of the gate of the MOS transistor may be determined by means of simulation or a test, to further supply a level to the gate of the MOS transistor by using a pulse signal. In some implementations, a pulse signal may be provided by using a same clock signal, and the clock signal is connected to one of the gate of the PMOS transistor or the gate of the NMOS transistor of the alternate voltage source module, and connected to another one by using a phase inverter. Such a power supply circuit does not need to detect $V_{out}$ in real time, thereby reducing a calculation burden of a real-time detection and control module and reducing complexity of the circuit.

In some implementations, to avoid a problem that because a clock signal is not that accurate, errors gradually accumulate as time passes, leading to that an output voltage is not that accurate, a preset duration may be set. When power is supplied by using an alternate voltage source module for the preset duration, a Bandgap may be re-connected to a standard cell to perform calibration on a bleeder resistance, and resistance values of a first resistor of the standard cell and a first resistor of an alternate voltage source, so that accuracy and stability of an output voltage is further ensured. In some implementations, a pulse signal may be provided by using a second clock signal, and the clock signal is connected to one of a gate of a PMOS transistor or a gate of an NMOS transistor of the standard cell, and connected to another by using a phase inverter. A period of the pulse signal is not greater than a preset duration.

In such a control method, a power supply circuit can be calibrated in a timely manner by using a clock signal, thereby reducing a calculation burden of a real-time detection and control module and reducing complexity of the circuit.

Figure 13:
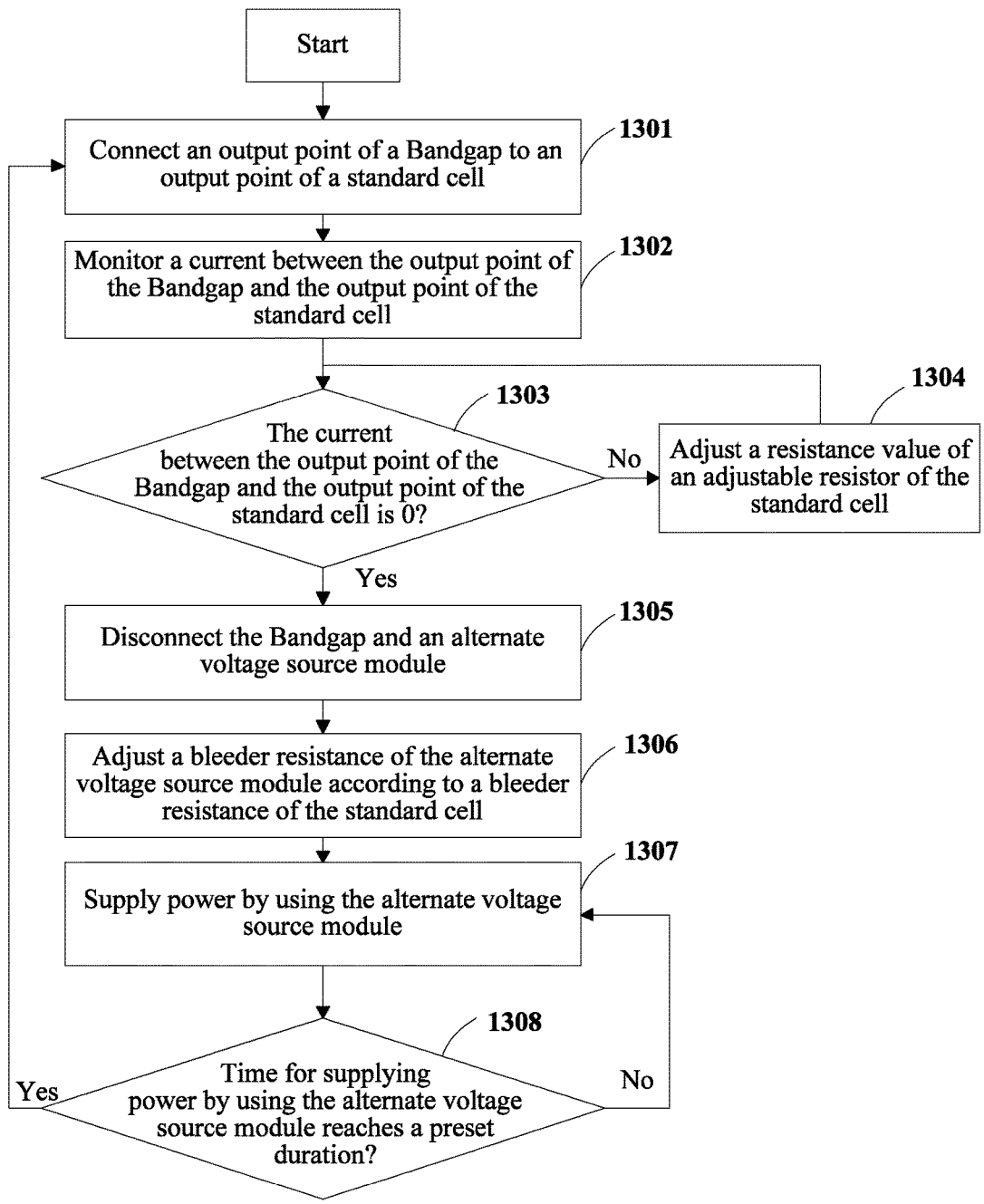
FIG. 13 is a flowchart of another form of a power supply circuit control method.

FIG. 13 is a flowchart of another power supply circuit control method.

Step 1301: Connect an output point of a Bandgap to a marking point of a standard cell.

Step 1302: Monitor a current between the output point of the Bandgap and the marking point of the standard cell. In some implementations, there is a resistor between two points to prevent the circuit from being damaged due to an excessive current.

Step 1303: Determine whether the current between the output point of the Bandgap and the marking point of the standard cell is 0. If the current is 0, adjustment is completed and step 1305 is performed. If the current is not 0, step 1304 is performed.

Step 1304: Adjust a resistance value of an adjustable resistor of the standard cell, to reduce the current between the output point of the Bandgap and the marking point of the standard cell.

Step 1305: Complete a process of performing voltage calibration on a marking point of the standard cell, disconnect the output point of the Bandgap to the marking point of the standard cell, close the Bandgap module and the standard cell, supply a low level to a gate of a PMOS transistor of an alternate voltage source, and supply a high level to a gate of an NMOS transistor of an alternate voltage source.

Step 1306: Adjust a bleeder resistance of an alternate voltage source module according to a bleeder resistance of the standard cell, so that the bleeder resistance of the alternate voltage source module is equal to the bleeder resistance of the standard cell.

Step 1307: Supply power by using the alternate voltage source module. In this process, voltages of the gates of the PMOS transistor and the NMOS transistor of the alternate voltage source are controlled by using a clock signal, so that an output point voltage of the alternate voltage source module is stable in a preset range.

Step 1308: Determine whether time for supplying power by using the alternate voltage source module reaches a preset duration. If the preset duration is reached, step 1301 is performed, and calibration is re-performed. If the preset duration is not reached, step 1307 is continually performed.

In such a control method, adjustment and calibration can be performed in real time on an output point voltage of an alternate voltage source module. On the one hand, performance of an electrical equipment is ensured. On the other hand, the electrical equipment is prevented from being damaged due to voltage instability.

Finally, it should be noted that the foregoing embodiments are merely intended for describing the technical solutions of the present invention, but not for limiting the present invention. Although the present invention is described in detail with reference to the preferred embodiments, a person of ordinary skill in the art should understand that they may still make modifications to the specific implementations of the present invention or make equivalent replacements to some technical features, without departing from the spirit of the technical solutions of the present invention. The modifications or equivalent replacements shall fall within the protection scope of the technical solutions of the present invention.

What is claimed is:

1. A power supply circuit, comprising:
   a bandgap voltage reference Bandgap;
   a real-time detection and control module; and
   an alternate voltage source module;
   wherein the real-time detection and control module is connected to the Bandgap and the alternate voltage source module, and the real-time detection and control module is configured to adjust an output point voltage of the alternate voltage source module according to an output voltage of the Bandgap; and
   wherein when the output point voltage of the alternate voltage source module reaches a target voltage, the real-time detection and control module is configured to make the Bandgap enter a non-power supply state, and to supply power using the alternate voltage source module.

2. The power supply circuit according to claim 1, wherein at least one of:
   the alternate voltage source module has multiple output point voltages, wherein the multiple output point voltages may be configured to be the same voltage or different voltages; or
   the power supply circuit comprises multiple alternate voltage source modules, wherein the output point voltages of the multiple alternate voltage source modules may be configured to be the same voltage or different voltages.

3. The power supply circuit according to claim 1, wherein the real-time detection and control module comprises:
   a detection and control unit, and
   a standard cell;
   wherein the detection and control unit is connected to the Bandgap and the standard cell, and the detection and control unit is configured to adjust a bleeder circuit of the standard cell according to the output voltage of the Bandgap so that a voltage of a marking point of the standard cell is equal to the output voltage of the Bandgap; and wherein the real-time detection unit is configured to adjust a bleeder circuit of the alternate voltage source module according to the bleeder circuit of the standard cell so that the output point voltage of the alternate voltage source module reaches the target voltage.

4. The power supply circuit according to claim 1, wherein when a power-supply duration of the alternate voltage source module reaches a preset duration, the real-time detection and control module is configured to re-adjust the output point voltage of the alternate voltage source module according to the output voltage of the Bandgap so that the output point voltage of the alternate voltage source module reaches the target voltage.

5. The power supply circuit according to claim 1, wherein:
the alternate voltage source module comprises:
  a PMOS transistor;
  an NMOS transistor;
  a first resistor;
  a second resistor; and
  a capacitor;
a source and a drain of the PMOS transistor are respectively connected to an input high level and a first end of the first resistor;
a source and a drain of the NMOS transistor are respectively connected to the ground and a second end of the second resistor;
a second end of the first resistor is connected to a first end of the second resistor, wherein at least one of the first resistor or the second resistor is an adjustable resistor, and a control end of the adjustable resistor is connected to a resistance control end of the real-time detection and control module;
the capacitor is connected to the ground and the first end of the second resistor; and
an output point of the alternate voltage source module is located in the second resistor, and a ratio of a resistance value between the output point and the ground to that of the second resistor is equal to a ratio of the target voltage to the output voltage of the Bandgap.

6. The power supply circuit according to claim 3, wherein:
the standard cell comprises:
  a PMOS transistor;
  an NMOS transistor;
  a first resistor of the standard cell; and
  a second resistor of the standard cell;
a source and a drain of the PMOS transistor are respectively connected to an input high level and a first end of the first resistor of the standard cell;
a source and a drain of the NMOS transistor are respectively connected to the ground and a second end of the second resistor of the standard cell;
the first resistor of the standard cell is an adjustable resistor, and a control end of the first resistor of the standard cell is connected to a resistance control end of the detection and control unit; and
the detection and control unit controls and adjusts a resistance value of the first resistor of the standard cell, so that an output voltage of a second end of the first resistor of the standard cell and/or a first end of the second resistor of the standard cell is the same as the output voltage of the Bandgap.

7. The power supply circuit according to claim 6, wherein:
the alternate voltage source module comprises:
  a PMOS transistor;
  an NMOS transistor;
  a first resistor of the alternate voltage source module;
  a second resistor of the alternate voltage source module; and
  a capacitor;
a source and a drain of the PMOS transistor are respectively connected to an input high level and a first end of the first resistor of the alternate voltage source module;
a source and a drain of the NMOS transistor are respectively connected to the ground and a second end of the second resistor of the alternate voltage source module;
a second end of the first resistor of the alternate voltage source module is connected to a first end of the second resistor of the alternate voltage source module;
the capacitor is connected to the ground and an output point of the alternate voltage source module, wherein the output point is located in the second resistor of the alternate voltage source module, and a ratio of a resistance value between the output point and the ground to that of the second resistor of the standard cell is equal to a ratio of the target voltage to the output voltage of the Bandgap;
a resistance value of the second resistor of the alternate voltage source module is equal to that of the second resistor of the standard cell; and
the first resistor of the alternate voltage source module is an adjustable resistor that connects a control end to the resistance control end of the detection and control unit, and the detection and control unit is configured to adjust a resistance value of the first resistor of the alternate voltage source module to be the same as that of the first resistor of the standard cell.

8. The power supply circuit according to claim 7, wherein:
a second resistor $R_2$ of the alternate voltage source module is formed by multiple resistors $R_2, R_{22}, \ldots, R_{2n}$ that are in serial connection, wherein n is a positive integer not less than 2;
a first end of $R_{21}$ is connected to the second end of the first resistor of the alternate voltage source module, and a second end of $R_{21}$ is connected to a first end of $R_{22}$;
a first end of $R_{2k}$ is connected to a second end of $R_{2(k-1)}$, and a second end of $R_{2k}$ is connected to a first end of $R_{2(k+1)}$, wherein k is a positive integer and 1<k<n;
a first end of $R_{2n}$ is connected to a second end of $R_{2(n-1)}$, and a second end of $R_{2n}$ is connected to the drain of the NMOS; and
a first end of $R_{2j}$ is connected to the capacitor of which another end is grounded, wherein j is a positive integer and 1≤j≤n, and
ratios of $R_{2j}+R_{2(j+1)}+\ldots R_{2n}$ to the second resistor of the standard cell are respectively equal to a ratio of a single target voltage to the output voltage of the Bandgap.

9. The power supply circuit according to claim 6, wherein to adjust the bleeder circuit of the standard cell according to the output voltage of the Bandgap, so that a voltage of a marking point of the standard cell is equal to the output voltage of the Bandgap, the detection and control unit is configured to:
connect an output point of the Bandgap to the second end of the first resistor of the standard cell; and
adjust the resistance value of the first resistor of the standard cell, so that a current between the output point of the Bandgap and the second end of the first resistor of the standard cell is 0, wherein a voltage of the second end of the first resistor of the standard cell is the voltage of the marking point.

10. The power supply circuit according to claim 6, wherein when the detection and control unit adjusts at least one of the first resistor of the standard cell or the first resistor of the alternate voltage source module, a gate of the PMOS transistor is in a low level, and a gate of the NMOS transistor is in a high level.

11. The power supply circuit according to claim 7, further comprising:
when power is supplied using the alternate voltage source module, control levels are respectively supplied to the gates of the PMOS transistor and the NMOS transistor by means of a preset pulse, wherein the control levels supplied to the gates of the PMOS transistor and the NMOS transistor are contrary.

12. A method for forming a power supply circuit, comprising:
connecting a bandgap voltage reference Bandgap to a real-time detection and control module;
connecting an alternate voltage source module to the real-time detection and control module;
wherein the real-time detection and control module adjusts an output point voltage of the alternate voltage source module according to an output voltage of the Bandgap; and
wherein when the output point voltage of the alternate voltage source module reaches a target voltage, the Bandgap enters a non-power supply state and the alternate voltage source module supplies power.

13. The method according to claim 12, wherein at least one of:
the alternate voltage source module has multiple output point voltages, wherein the multiple output point voltages may be configured to be the same voltage or different voltages; or
the power supply circuit comprises multiple alternate voltage source modules, wherein the output point voltages of the multiple alternate voltage source modules may be configured to be the same voltage or different voltages.

14. The method according to claim 12, further comprising:
generating the real-time detection and control module, comprising:
generating a detection and control unit, and
generating a standard cell;
connecting the detection and control unit to the Bandgap and the standard cell; and
connecting the detection and control unit to the alternate voltage source module.

15. The method according to claim 14, wherein generating a standard cell comprises:
respectively connecting a source and a drain of a PMOS transistor to an input high level and a first end of a first resistor of the standard cell;
respectively connecting a source and a drain of an NMOS transistor to the ground and a second end of a second resistor of the standard cell;
connecting a second end of the first resistor of the standard cell to a first end of the second resistor of the standard cell, wherein the first resistor is an adjustable resistor;
connecting a control end of the first resistor to a resistance control end of the detection and control unit; and
connecting a capacitor to the ground and the first end of the second resistor.

16. The method according to claim 12, further comprising:
generating the alternate voltage source module, comprising:
respectively connecting a source and a drain of a PMOS transistor to the input high level and a first end of a first resistor of the alternate voltage source module;
respectively connecting a source and a drain of a NMOS transistor to the ground and a second end of a second resistor of the alternate voltage source module;
connecting a second end of the first resistor of the alternate voltage source module to a first end of the second resistor of the alternate voltage source module, wherein the first resistor is an adjustable resistor;
connecting a control end of the first resistor to a resistance control end of the real-time detection and control module;
connecting the capacitor to the ground and the first end of the second resistor of the alternate voltage source module; and
setting an output point on the second resistor of the alternate voltage source module.

17. The method according to claim 16, further comprising:
performing at least one of:
connecting a gate of the PMOS transistor to a pulse controller; and
connecting a gate of the NMOS transistor to the pulse controller by using a phase inverter; or
connecting a gate of the NMOS transistor to a pulse controller; and
connecting a gate of the PMOS transistor to the pulse controller by using a phase inverter.

18. A power supply circuit control method, comprising:
connecting an output point of a bandgap voltage reference Bandgap to a marking point of a first resistor of a standard cell;
adjusting a bleeder circuit of the standard cell so that a current between the output point of the Bandgap and the marking point of the first resistor of the standard cell is zero; and
adjusting a bleeder circuit of an alternate voltage source module according to the bleeder circuit of the standard cell so that an output point voltage of the alternate voltage source module reaches a target voltage;
when the output point voltage of the alternate voltage source module reaches the target voltage, supplying power using the alternate voltage source module;
wherein at least one of:
the alternate voltage source module has multiple output point voltages, wherein the multiple output point voltages may be configured to be the same voltage or different voltages; or
the power supply circuit comprises multiple alternate voltage source modules, wherein the output point voltages of the multiple alternate voltage source modules may be configured to be the same voltage or different voltages.

19. The method according to claim 18, further comprising:
when a power-supply duration of the alternate voltage source module reaches a preset duration, re-adjusting the output point voltage of the alternate voltage source module according to the output voltage of the Bandgap so that the output point voltage of the alternate voltage source module reaches the target voltage.

20. The method according to claim 18, wherein:
adjusting a bleeder circuit of the standard cell so that a current between the output point of the Bandgap and the marking point of the first resistor of the standard cell is zero comprises:
  outputting a low level to a gate of a PMOS transistor of the standard cell and supplying a high level to a gate of an NMOS transistor of the standard cell; and
  adjusting a resistance value of the first resistor of the standard cell so that the current between the output point of the Bandgap and the marking point of the standard cell is 0, wherein the output point of the Bandgap is connected to a second end of the first resistor of the standard cell; and
the standard cell comprises:
  the PMOS transistor;
  the NMOS transistor;
  the first resistor of the standard cell; and
  a second resistor of the standard cell, and
a source and a drain of the PMOS transistor are respectively connected to an input high level and a first end of the first resistor of the standard cell;
a source and a drain of the NMOS transistor are respectively connected to the ground and a second end of the second resistor of the standard cell;
the second end of the first resistor of the standard cell is connected to a first end of the second resistor of the standard cell, wherein the first resistor of the standard cell is an adjustable resistor; and
the capacitor is connected to the ground and the first end of the second resistor, wherein the second end of the first resistor and/or the first end of the second resistor is the marking point of the standard cell.

21. The method according to claim 20, wherein:
adjusting a bleeder circuit of the alternate voltage source module according to the bleeder circuit of the standard cell so that the output point voltage of the alternate voltage source module reaches the target voltage comprises:
  supplying a low level to a gate of a PMOS transistor of the alternate voltage source module, and supplying a high level to a gate of an NMOS transistor of the standard cell; and
  adjusting a resistance value of a first resistor of the alternate voltage source module, so that the resistance value of the first resistor of the alternate voltage source module is equal to that of the first resistor of the standard cell; and
the alternate voltage source module comprises:
  the PMOS transistor;
  an NMOS transistor;
  a capacitor;
  the first resistor of the alternate voltage source module; and
  a second resistor of the alternate voltage source module, wherein a resistance value of the second resistor of the alternate voltage source module is equal to that of the second resistor of the standard cell, and
a source and a drain of the PMOS transistor are respectively connected to an input high level and a first end of the first resistor of the alternate voltage source module;
a source and a drain of the NMOS transistor are respectively connected to the ground and a second end of the second resistor of the alternate voltage source module;
a second end of the first resistor of the alternate voltage source module is connected to a first end of the second resistor of the alternate voltage source module, wherein the first resistor of the alternate voltage source module is an adjustable resistor; and
the capacitor is connected to the ground and an output point of the alternate voltage source module, wherein the output point is located in the second resistor of the alternate voltage source module, and a ratio of a resistance value between the output point and the ground to that of the second resistor of the standard cell is equal to a ratio of the target voltage to the output voltage of the Bandgap.

22. The method according to claim 21, further comprising:
when power is supplied using the alternate voltage source module, respectively outputting control levels to the gates of the PMOS transistor and the NMOS transistor by means of a preset pulse, wherein the control levels supplied to the gates of the PMOS transistor and the NMOS transistor are contrary.

* * * * *